Patented Feb. 10, 1953

2,628,205

UNITED STATES PATENT OFFICE 2,628,205

VISCOUS HYDROPHILIC COMPOSITION AND METHOD OF MAKING THE SAME

Milton J. Shoemaker, Madison, Wis., assignor to Research Products Corporation, Madison, Wis., a corporation of Wisconsin No Drawing. Application October 21, 1950, Serial No. 191,495

12 Claims. (Cl. 260—29.6)

This invention relates to improvements in viscous hydrophilic compositions and methods for making the same, and particularly to such compositions which have modified mineral oil as the base and contain an emulsifier. The compositions may be in the form of a non-fluid plastic paste or cream or may be of liquid consistency. They have valuable properties for a wide field of use, examples of which are ointments, cosmetic creams, salves, lotions, and the like.

Viscous compositions for the general purposes mentioned and containing an emulsifier have been known heretofore, which have as their base petrolatum, lanolin, a mixture of beeswax and mineral oil, etc. The manufacture and use of such products have been attended with difficulty. For example, the manufacture requires extensive mixing and milling, which is time and labor consuming and requires much plant space and machinery. Also, the ingredients thereof tend to separate and segregate with time, which condition is aggravated at summer temperatures. They present the additional difficulty that the viscosity and consistency thereof tend to change with temperature and with time.

The present invention provides a viscous hydrophilic composition which is improved in all of the respects mentioned. The manufacturing procedure is simple and convenient and requires relatively little labor, time, machinery and plant space. The consistency of the composition is uniform and homogeneous and is retained without substantial change for a long period of time. In addition, the viscosity remains relatively uniform for long periods of time and under varying temperature conditions from 0° C. to 50° C. which are the temperatures ordinarily encountered in use. This has the important advantage that a non-fluid cream does not melt or undergo segregation of the ingredients at summer heat, and that when such a cream is applied to the skin it does not liquify. Medicaments may be incorporated in such a cream and it has the advantage that the medicaments are readily released in contact with an absorptive surface such as the skin and are efficiently utilized.

In accordance with the present invention, it has been discovered that a composition of the character described having improved consistency and stability characteristics is formed by dissolving in the mineral oil a modifying proportion of polyethylene, this operation being carried out at an elevated temperature at which the polyethylene is soluble in the mineral oil. The mineral oil-polyethylene solution is then rapidly cooled to a low temperature at which the polyethylene is insoluble in the mineral oil. As will be described in detail hereinafter, polyethylene is soluble in mineral oil above a certain temperature and insoluble below said temperature, this temperature depending upon the molecular weight of the polyethylene. During the rapid cooling, the polyethylene goes out of true solution and into a dispersed condition in which it imparts to the mineral oil base the improved consistency and stability characteristics described above. The operation usually results in a substantial increase in the viscosity of the composition. If the mineral oil is of low viscosity, for example if it is of liquid or fluid character, the procedure may cause it to be thickened to a non-fluid, plastic paste or cream. Such a paste or cream is thixotropic in character. If the mineral oil is itself of high viscosity there may be a less pronounced increase in viscosity but the advantages of uniform consistency and stability are obtained.

The oils which may be used and which are embraced within the term "mineral oil" as the same is used herein in the specification and claims are the oils which are liquid at any temperature in the range from 0° C. to 60° C. and which are essentially hydrocarbons occurring in mineral oil, their distillates and their cracked or polymerized derivatives, an example of the last being polybutene which includes the polymers of butylene and its isomers. The mineral oil may be of any desired character or viscosity, from one which is a thin liquid to one which is thick such that it does not flow at ordinary temperature (20° C.). Where the composition is used for ointments, salves, cosmetic creams or the like, a purified liquid mineral oil is preferred.

As the modifying agent, polyethylene may be used having an average molecular weight of 3500 or more, as determined by the William Plastometer method (J. I. & E. C., vol. 16, No. 4, p. 362; 1924). Polyethylenes having an average molecular weight varying from 3500 to 26,000 have been used successfully. The amount of polyethylene required to produce the consistency modifying effect is not critical and may vary over wide limits, depending on the viscosity of the mineral oil, the molecular weight of the polyethylene, the desired viscosity of the final composition, etc. By "consistency modifying effect" is meant the effect in producing any of the improved characteristics described heretofore. In general, the modifying effect of a given proportion of polymer of ethylene increases as the molecular weight of the polymer increases and also as the viscosity of the oil increases. Substantial modifying effects have been obtained by the use of an amount of polyethylene equal to about 0.25% to about 50% of the weight of the mineral oil-polyethylene base, the lower proportion being useful with an oil of relatively high viscosity, say 340–350 seconds Saybolt Universal at 38° C. and a polyethylene of high average molecular weight, say 18,000–20,000, and the high proportion being useful when the oil is of relatively low viscosity, say 75–80 seconds Saybolt Universal at 38° C. and the polyethylene is of relatively low molecular weight, say 3700.

With respect to the emulsifier, any suitable emulsifier may be used. This class of compound is well known and includes a large number of substances. The use of emulsifiers with mineral oil, wax or other hydrocarbons is also well known. The present invention is directed to the provision of an hydrophilic composition having improved consistency and stability characteristics employing a modified mineral oil base. The same emulsifiers may be used with such base as may be used with mineral oil itself. Examples of suitable emulsifiers are as follows: derivatives of carboxylic acid, such as soaps formed by the reaction of sodium hydroxide or potassium hydroxide with stearic acid; amino derivatives, such as triethanolamine stearate and others; di-hydroxyl derivatives, such as glycol monostearate; tri-hydroxyl derivatives, such as glyceryl monostearate; polyhydroxyl derivatives, such as derivatives of sorbitol and mannitol; sulfonated and sulfated derivatives, such as dioctyl sodium sulfosuccinate, sodium lauryl sulfate, the sulfonated oils, and the sulfonated amides; complex carbohydrates, for example, certain natural gums such as gum acacia; phosphoric acid esters such as the lecithins and cephalines; certain glycol and glyceryl esters, such as glycol laurate, diethylene glycol monolaurate, glycol oleate, propylene glycol laurate, glyceryl laurate, glyceryl monoricinoleate, etc.; lanolin and cholesterol; polyhydroxyl derivatives of fatty acids, such as mannitol monooleate.

The above emulsifiers form compositions of one of two types, the first forming with water an oil-in-water emulsion, that is, an emulsion in which the water is the continuous phase and the mineral oil is the discontinuous phase, and the second forming with water a water-in-oil emulsion. Some of them form both types, depending upon the conditions under which the emulsion is formed, i. e., the temperature, the relative concentration of the ingredients, etc. These phenomena are known to those skilled in the art.

The amount of emulsifier required to impart the desired hydrophilic character to the composition is not critical and may vary within wide limits, depending upon the character of the emulsifier and the proportions of the other ingredients, and also the amount of water which the composition may be desired to accommodate in the formation of an emulsion. Amounts of about 1% to 25%, based on the weight of the mineral oil, are satisfactory for most uses. The hydrophilic character of the composition is due to its ability to form an emulsion with water, which is imparted to it by the emulsifier. With respect to the amount of emulsifier, the term "emulsion forming amount" or a similar term will be used herein in the specification and claims to indicate that proportion of the emulsifier which produces the characteristic in the composition of forming an emulsion with water.

In making the hydrophilic composition, a consistency modifying proportion of polyethylene is dissolved in the mineral oil at the elevated temperature required for solution. In the absence of an opacity producing substance, the solution is clear and transparent. The emulsifier, in a substantial proportion, by which is meant an emulsion forming proportion, may be added at this stage of the process, or alternatively at a later stage as will be described hereinafter. If the resulting composition is not fluid, the temperature is raised sufficiently to render it fluid and it is thoroughly agitated to provide intimate mixture of the ingredients. The temperature thereof may then be adjusted to the temperature at which it is desired to start the rapid cooling operation, which is an elevated temperature at which the polyethylene is soluble in the mineral oil. It is then rapidly cooled to a temperature at which the polyethylene is insoluble in the mineral oil, the cooling being at a rate of at least one degree C. per minute.

When the solution of mineral oil and polyethylene, without opacity producing ingredients, is cooled through the proper temperature range, a clouding effect occurs during which the solution changes from a clear liquid to one which is cloudy or turbid. With the rapid cooling, the clouding effect accompanies the change of condition which produces the improved characteristics and these two phenomena, cloudiness and altered condition, exist together in the rapidly cooled product. It is caused by the polyethylene going out of true solution and into a dispersed condition. In other words, the composition changes from a true solution to a colloidal solution in which the mineral oil is the dispersion medium and the polyethylene is the dispersoid.

The clouding also occurs at substantially the same temperature when the solution is cooled slowly as described heretofore, but a colloidal solution is not formed. Instead the polyethylene forms relatively coarse agglomerates in the mineral oil, and the result is that the composition is not of uniform consistency but is grainy and the components thereof undergo substantial separation on standing, and the mineral oil bleeds from the composition. In addition, the great increase in viscosity is not obtained. In other words, the benefits of the invention are not obtained with slow cooling.

The cloudiness continues and increases over a cooling range of several degrees. For simplicity, this range at which clouding occurs is called herein the cloud range and the temperature at which substantial clouding begins is called the cloud point. The cloud point varies with the molecular weight and concentration of the polyethylene, as exemplified by the following schedule. It is determined by observation while stirring a quantity of the solution and allowing it to cool slowly by standing in the atmosphere at room temperature. In the schedule, the Saybolt Universal viscosity of the mineral oil is given in seconds at 38° C. and the average molecular weight and the concentration of the polyethylene are given, the latter being in per cent of the weight of a solution of mineral oil and polyethylene only.

| Viscosity of Oil, Seconds | Mol. Wt. of Polyethylene | Concentration of Polyethylene, Percent | Cloud Point, °C. |
|---|---|---|---|
| 340–350 | 3,700 | 2 | 55 |
| 340–350 | 3,700 | 10 | 76 |
| 340–350 | 7,000 | 2 | 65 |
| 340–350 | 18,000–20,000 | 2 | 78 |
| 340–350 | 24,000–26,000 | 2 | 80 |
| 75–80 | 18,000–20,000 | 2 | 77.5 |

With polyethylene having molecular weights in a narrow range, the cloud range covers only a few degrees. When a mixture of polyethylenes of different molecular weights is used, the cloud range may be quite wide.

The rapid cooling is carried through the cloud range or at least a substantial portion thereof. The temperature of the solution is first adjusted so that it is above or in the cloud range and then it is cooled rapidly to a lower temperature which is within or below the cloud range. It is preferred that the rapid cooling extend through the entire cloud range, but if the cloud range is wide the cooling may extend through less than the entire cloud range. A cooling range of about 10 degrees C. produces a substantial improvement. Greater ranges usually produce an increased effect and are preferred. The rate of cooling should be at least one degree C. per minute and rates as high as 8,000 degrees C. per minute have been used and have produced remarkably improved results. For general purposes, cooling from 80° C. or higher to 50° C. or lower in the space of one minute or less produces satisfactory results. This provides a cooling rate of at least 30 degrees C. per minute. The upper temperature is preferably about 80° C. to 100° C. The cooling may be carried as low as desired. Under some conditions there is a tendency for a small amount of the mineral oil to bleed from the composition, but when the rapid cooling is stopped at a temperature of about 35° C. to 50° C. there is no substantial bleeding. For example, with polyethylenes having average molecular weights of 7,000 and 18,000–20,000 the optimum stopping temperatures are about 40° C. to 43° C. and about 45° C. to 50° C., respectively.

Any suitable method of heat exchange may be used for cooling. For example, the heated solution may be flowed in the form of a thin layer upon one surface of a sheet of heat conductive material such as metal, while the opposite surface is cooled by a liquid coolant, such as water. In such procedure, the surface contacted by the composition is maintained at a suitable cooling temperature, for example 50° C. or lower.

As an alternative to the procedure described heretofore, the solution of polyethylene in mineral oil alone may first be rapidly cooled and the emulsifier may then be added to the cooled composition and intimately mixed therein by agitation.

The character of the rapidly cooled product is different from that of a similar composition which has been slow cooled. By slow cooling is meant allowing a mass of the heated composition to cool by standing in an atmosphere at room temperature (20° C.) until it reaches such temperature. The rapidly cooled product is of higher viscosity and usually is a non-fluid ointment or paste. It has a smooth uniform consistency which it retains for a long period of time without substantial separation of the ingredients. The slow cooled product is of lower viscosity and if it is a paste the consistency is not smooth and uniform but is more or less grainy and there is a separation of the ingredients and substantial bleeding of the mineral oil.

The following are several examples of improved hydrophilic compositions of the present invention and methods for making the same. In these examples the Saybolt Universal viscosity of the mineral oil is given in seconds at 38° C.

Example 1

Parts by weight
Mineral white oil (visc., 75–80 sec.) _____ 85.5
Polyethylene (mol. wt., 18,000–20,000) ____ 4.5
Glyceryl monostearate _____ 9.5
Titanium dioxide _____ 0.5

In this composition the glyceryl monostearate is the emulsifier. The polyethylene is dissolved in the mineral oil at a temperature of 120° C. to 135° C. and the glyceryl monostearate is then added and the composition is agitated until the glyceryl monostearate is thoroughly dispersed. The temperature of the composition is then adjusted to 90° C. to 100° C. It is then cooled rapidly by flowing it in a thin layer against the exterior surface of a hollow metal drum, the interior surface of which is contacted by relatively cold water, a temperature of 15° C. being suitable. The composition spreads out into the form of a thin layer upon the drum surface and cools suddenly, and in this procedure the cooling has been observed to occur within the space of 0.1 minute. The composition thickens into a non-fluid, plastic paste or cream which is scraped from the drum surface. The rate of flow upon the drum and the other heat exchange conditions are so controlled that the cooling is stopped when the composition has reached a temperature of 45° C. to 50° C. The concentration of polyethylene in mineral oil in the composition remains substantially unchanged during the cooling operation. After the cooling operation, the titanium dioxide is added and thoroughly dispersed in the composition by means of a roll mill or a colloid mill. If desired, a small amount of perfume may be added at the same time that the titanium dioxide is added.

The resulting composition is a non-fluid thixotropic unctuous hydrophilic cream which may be used as a cosmetic cream. It has a viscosity of approximately 5600 poises at 20° C., when measured by the Brookfield rotational viscosimeter at one R. P. M. It has a smooth homogeneous consistency and is stable in that it retains its consistency for a long period of time during which there is substantially no separation of liquid oil from the composition. Its hydrophilic character facilitates spreading of the cream and removal from the skin. It also permits evaporation of perspiration from the skin and it penetrates the pores whereby cleansing is more thorough.

The same composition when made in the same manner except that cooling is slow instead of rapid, that is, the mixture of mineral oil, polyethylene and glyceryl monostearate is allowed to stand in the atmosphere at 20° C. until it cools to that temperature, has a viscosity of 520 poises when measured by the same method, and while it is of a homogeneous consistency immediately after it has been made, it does not retain this consistency, but a portion of the oil separates as a clear liquid upon the top of the composition.

It is evident from the foregoing description that the manufacture of the viscous composition in accordance with the present invention is simple and inexpensive, and avoids the extensive milling and mixing procedure heretofore employed, which require great amounts of time, machinery and plant space.

Example 2

Ten parts by weight of water are added to the final composition of Example 1 and thoroughly emulsified into the composition by means of a colloid mill. The emulsion so formed is of the water-in-oil type, that is, it has an organic phase which is continuous and an aqueous phase which is discontinuous. The resulting composition is a smooth textured non-fluid cream having a viscosity of 7300 poises at 20° C. It is also useful as a cleansing cream which has the desirable property of not dehydrating or irritating the skin.

Example 3

In this example, the composition is similar to that of Example 1, but the glyceryl monostearate, instead of being added before the rapid cooling operation, is added after such operation, that is, at the same time that the titanium dioxide is added and the composition is then milled in a colloid mill. The final composition is substantially the same as that of Example 1.

Example 4

The composition and procedure are the same as given heretofore in connection with Example 1 with the exception that mineral white oil of a viscosity of 340-350 seconds at 38° C. is used instead of mineral white oil of a viscosity of 75-80 seconds. The product has a viscosity of 24,400 poises at 20° C., which is considerably higher than the viscosity of the product of Example 1. It is a night cream of the heavy type. A similar composition, but made by a slow cooling process as described in connection with Example 1 has a viscosity of 3600 poises at 20° C. and is not of homogeneous consistency. In this example, water may be added as in Example 2, and the emulsifier may be added after instead of before the rapid cooling operation as in Example 3.

Example 5

|  | Parts by weight |
|---|---|
| Mineral white oil (visc., 75-80 sec.) | 86 |
| Polyethylene (mol. wt., 3700) | 5 |
| Glyceryl monostearate | 9 |

The procedure is the same as in Example 1 through the rapid cooling operation. The resulting composition has a viscosity 4300 poises at 20° C. and is a highly satisfactory hair and scalp conditioner. In this example, the glyceryl monostearate may be added after instead of before the rapid cooling operation, in the same manner as described in connection with Example 1.

Example 6

|  | Parts by weight |
|---|---|
| Mineral white oil (visc., 75-80 sec.) | 85.5 |
| Polyethylene (mol. wt., 18,000-20,000) | 4.5 |
| Glyceryl monooleate | 9.5 |
| Titanium dioxide | 0.5 |

The procedure is similar to that described in connection with Example 1. The resulting composition has a viscosity of 3400 poises at 20° C. and is a highly satisfactory cleansing cream which spreads readily on the skin.

Ten parts of water may be emulsified into the final composition of Example 6 as described in connection with Example 2 to form a cream having a viscosity of 3440 poises at 20° C.

Example 7

The composition and procedure are the same as in Example 6 with the exception that mineral oil having a viscosity of 340 seconds at 38° C. is used instead of mineral oil having a viscosity of 75-80 seconds. The product is a satisfactory night cream having a viscosity of 9300 poises at 20° C. The same composition may have ten parts by weight of water emulsified into it, and the resulting composition is also a satisfactory night cream having a viscosity of 5000 poises at 20° C.

Example 8

The composition and procedure are the same as in Example 6 with the exception that polyethylene having a molecular weight of 3700 is used instead of polyethylene having a molecular weight of 18,000-20,000. The product is a viscous liquid having a viscosity of 260 poises at 20° C.

Example 9

|  | Parts by weight |
|---|---|
| Mineral white oil (visc., 75-80 sec.) | 49.46 |
| Polyethylene (mol. wt., 18,000-20,000) | 0.54 |
| Glyceryl monooleate | 10 |

The procedure is the same as given above in connection with Example 1 through the rapid cooling operation. The cooled composition has a viscosity of 680 poises at 20° C. Ten parts of water may be emulsified into the cooled composition of Example 9, when the resulting composition has a viscosity of 260 poises at 20° C. Forty parts of water may be emulsified into the cooled composition of Example 9, when the resulting composition has a viscosity of 730 poises at 20° C. These various compositions are suitable for use as hair and scalp conditioners.

Example 10

|  | Parts by weight |
|---|---|
| Mineral oil (visc., 340-350 sec.) | 46.5 |
| Polyethylene (mol. wt., 18,000-20,000) | 2.5 |
| Water (distilled) | 49.3 |
| Carboxymethyl cellulose | 1.5 |
| Dioctyl sodium sulfosuccinate | .2 |

A viscous base composition of the mineral oil and polyethylene is made by rapid cooling in the same manner as in Example 1. As a separate operation, the carboxymethyl cellulose, which is a thickening agent, and dioctyl sodium sulfosuccinate, which is the emulsifier, are dissolved in the water. The solution is thoroughly mixed into the base to form a smooth white emulsion of the hydrophilic type which is suitable for use as a non-fluid cleansing cream, lotion, or as a supporting base or vehicle for cosmetics or medicaments. As an alternative, the dioctyl sodium sulfosuccinate may be added to the heated mineral oil, polyethylene solution before the rapid cooling operation.

Example 11

|  | Parts by weight |
|---|---|
| Polyethylene (mol. wt., 18,000-20,000) | 5 |
| Mineral white oil (visc., 340 sec.) | 45 |
| Coconut oil | 25 |
| Glycerine | 10 |
| Water | 13.8 |
| Carboxymethyl cellulose | .5 |
| Dioctyl sodium sulfosuccinate | .7 |

The polyethylene is preliminarily dissolved in 4 times its weight of mineral oil by heating at 135° C. The coconut oil and the balance of the mineral oil are then added with thorough mixing, and the temperature of the composition is adjusted to 90° C. The composition is then rapidly cooled as described in connection with Example 1. The remaining ingredients are prepared as a separate solution which is then emulsified with the rapidly cooled mineral oil-polyethylene composition by agitation. The resulting product is an excellent hand cream.

*Example 12*

| | Parts by weight |
|---|---|
| Liquid petrolatum (visc., 340 sec.) | 65.7 |
| Polyethylene (mol. wt., 18,000–20,000) | 3.5 |
| Glyceryl monostearate | 7.2 |
| Diglycol stearate | 7.2 |
| Glycerine | 1.8 |
| Carbowax 1500 monostearate | 3.6 |
| Sulfathiazole | 10.0 |

The polyethylene is preliminarily dissolved in 4 times its weight of the petrolatum by heating and stirring the mixture at approximately 135° C. The temperature of the solution is then lowered to approximately 95° C. and the remainder of the petrolatum and the other ingredients are then added. The composition is agitated until the other ingredients are dissolved and the solution is then rapidly cooled from the temperature of 95° C. in accordance with the procedure described in connection with Example 1. The resulting composition is a non-fluid, plastic, medicinal ointment.

As an alternative, the sulfathiazole may be added after the rapid cooling operation, in which case it is thoroughly milled into the composition.

*Example 13*

Ten parts by weight of water are added to the composition of Example 12 and thoroughly emulsified into it by means of a colloid mill. The emulsion so formed is of the oil-in-water type, that is, it has an aqueous phase which is continuous and an organic phase which is discontinuous. The resulting composition is also a non-fluid, plastic, medicinal ointment.

The several examples which have been given are not exhaustive of the compositions which can be made, but are illustrative only and many others may be made, employing mineral oil of different viscosity, polyethylene of different molecular weight and one or a mixture of several of the many emulsifiers which are suitable, including those listed hereinbefore and many others which are known to those skilled in the art.

That the character of a composition prepared by rapid cooling is different from that of a similar composition prepared by slow cooling is further evidenced by the comparative light transmitting properties of the rapidly cooled and slowly cooled mineral oil-polyethylene base thereof. The other ingredients were omitted to avoid any effect by them on the light transmitting properties. The following schedule shows the properties of a base composed of 95% by weight of mineral oil having a Saybolt Universal viscosity of 340–350 seconds at 38° C. and 5% of polyethylene of an average molecular weight of 18,000–20,000. The rapidly cooled product was cooled by the procedure described heretofore in connection with Example 1 and the slow cooled product was cooled from 90° C. to 20° C. by allowing a mass thereof to stand in an atmosphere at 20° C. The data for light transmission at 20° C. is as follows:

| Wave Length of Light, Millimicrons | Percent Transmission | |
|---|---|---|
| | Slow cooled product | Rapidly cooled product |
| 375 | 80.5 | 99 |
| 400 | 80.0 | 100 |
| 450 | 83.5 | 100 |
| 500 | 85.5 | 100 |
| 550 | 87.5 | 100 |
| 600 | 89.0 | 100 |
| 650 | 90.0 | 100 |
| 700 | 91.0 | 100 |

In the compositions in which the viscosity has been increased by the rapid cooling operation, the viscosity may be reduced by raising the temperature of the composition from an initial temperature below the cloud range, for example 20° C., to a point within or above the cloud range and then cooling the composition slowly to the initial temperature as by allowing a mass thereof to stand in an atmosphere at the initial temperature. For example, if the rapidly cooled product of Example 1 is heated to a temperature of 90° C. to 100° C., which is above the cloud point, and then slowly cooled to 20° C. the resulting product has a viscosity of approximately 520 poises, which is the viscosity of the slowly cooled product described heretofore in connection with Example 1.

In the same way, that is, by heating to a temperature above the cloud point and then slowly cooling to the initial temperature, the product of the invention is converted from a composition which is a colloidal solution in which the mineral oil is the dispersion medium and the polyethylene is the dispersoid, and which has a uniform, homogeneous consistency to a composition which is of grainy consistency and in which the polyethylene is coarsely agglomerated in the mineral oil and the mineral oil readily separates as a liquid on the top of the composition. The composition can be restored to the condition in which it is a colloidal solution having a smooth uniform consistency by again heating it above the cloud point and then cooling rapidly as described herein. The product is, therefore, in these respects thermally reversible.

The copending application of Stanley H. Frohmader and Virjean Archer, Serial No. 43,548, filed August 10, 1948, relates to a high viscosity composition of mineral oil and polyethylene and the method of making the same by rapid cooling.

What is claimed is:

1. A thixotropic hydrophilic composition comprising mineral oil, polyethylene and an emulsifier, said polyethylene having a molecular weight of at least 3500 and having been initially in solution in said mineral oil, said mineral oil-polyethylene solution having been cooled at a rate of at least thirty degrees C. per minute through a temperature range including the cloud point of said solution while the concentration of polyethylene in mineral oil in said solution was maintained substantially unchanged.

2. A thixotropic hydrophilic composition as claimed in claim 1 in which the proportion of emulsifier is about 1% to about 25% of the weight of the mineral oil.

3. A thixotropic hydrophilic composition as claimed in claim 1 in which the proportion of polyethylene is approximately 0.25% to 50% of the combined weight of polyethylene and mineral oil.

4. A thixotropic hydrophilic composition comprising mineral oil, polyethylene and an emulsifier, said polyethylene having a molecular weight of at least 3500 and having been initially in solution in said mineral oil, said mineral oil-polyethylene solution having been cooled at a rate of at least 30 degrees C. per minute through a temperature range of at least 10 degrees C. including the cloud point of the solution while the concentration of polyethylene in mineral oil in said solution was maintained substantially unchanged.

5. A thixotropic emulsion including an emulsifier and having an aqueous phase and an organic phase, said organic phase comprising mineral oil and polyethylene having a molecular weight of at least 3500, said polyethylene having been initially in solution in said mineral oil, said mineral oil-polyethylene solution having been cooled at a rate of at least thirty degrees C. per minute through a temperature range including the cloud point of said solution while the concentration of polyethylene in mineral oil in said solution was maintained substantially unchanged.

6. The thixotropic emulsion as claimed in claim 5 in which the organic phase is the continuous phase.

7. The thixotropic emulsion as claimed in claim 5 in which the organic phase is the discontinuous phase.

8. The method of improving the consistency and stability characteristics of a hydrophilic composition comprising mineral oil and an emulsifier, which comprises dissolving polyethylene having a molecular weight of at least 3500 in said mineral oil and cooling said mineral oil-polyethylene solution at a rate of at least thirty degrees C. per minute through a range of at least 10 degrees C. including the cloud point of said solution while maintaining the concentration of polyethylene in mineral oil in said solution substantially unchanged.

9. The method which comprises preparing a thixotropic hydrophilic composition comprising mineral oil, polyethylene having a molecular weight of at least 3500, and an emulsifier, which method includes forming a solution of said polyethylene in said mineral oil, and cooling at least the mineral oil-polyethylene solution component of said hydrophilic composition at a rate of at least thirty degrees C. per minute through a range of at least 10 degrees C. including the cloud point of said solution while maintaining the concentration of polyethylene in mineral oil in said solution substantially unchanged.

10. The method of preparing a thixotropic hydrophilic composition which comprises preparing a solution in mineral oil of polyethylene having a molecular weight of at least 3500, mixing an emulsifier in said solution, and cooling the resulting composition at a rate of at least thirty degrees C. per minute through a range of at least 10 degrees C., said range including the cloud point of said mineral oil-polyethylene solution while maintaining the concentration of polyethylene in mineral oil in said solution substantially unchanged.

11. The method of preparing a thixotropic hydrophilic composition which comprises cooling a solution of polyethylene having a molecular weight of at least 3500 in mineral oil at a rate of at least thirty degrees C. per minute through a range of at least 10 degrees C. including the cloud point of said solution while maintaining the concentration of polyethylene in mineral oil in said solution substantially unchanged, and mixing an emulsifier into said cooled composition.

12. The method of preparing a thixotropic hydrophilic composition, which comprises mixing together mineral oil, polyethylene having a molecular weight of at least 3500, and an emulsifier, causing said polyethylene to be dissolved in said mineral oil at a temperature above the cloud point of said mineral oil-polyethylene solution, and bringing said composition in the form of a thin layer into contact with a surface at a temperature below the cloud point of said mineral oil-polyethylene solution whereby said composition is suddenly cooled through a temperature range including the cloud point of said solution.

MILTON J. SHOEMAKER.

REFERENCES CITED

The following references are of record in the file of this patent:

UNITED STATES PATENTS

| Number | Name | Date |
|---|---|---|
| 2,313,144 | Gomm | Mar. 9, 1943 |

FOREIGN PATENTS

| Number | Country | Date |
|---|---|---|
| 613,018 | Great Britain | Nov. 22, 1948 |